United States Patent [19]

Baun, Jr.

[11] 4,251,884
[45] Feb. 17, 1981

[54] PARITY CIRCUITS

[75] Inventor: Philip J. Baun, Jr., Andover, Mass.

[73] Assignee: Bell Telephone Laboratories, Incorporated, Murray Hill, N.J.

[21] Appl. No.: 10,947

[22] Filed: Feb. 9, 1979

[51] Int. Cl.³ ............................................. G06F 11/10
[52] U.S. Cl. ...................................... 371/49; 307/216
[58] Field of Search .............. 340/146.1 AG; 307/216; 371/49, 51

[56] References Cited

U.S. PATENT DOCUMENTS

| | | | |
|---|---|---|---|
| 3,602,886 | 8/1971 | Carter et al. | 340/146.1 AG |
| 3,718,904 | 2/1973 | Bulfer et al. | 340/146.1 AG |
| 3,838,393 | 9/1974 | Dao | 340/146.1 AG |
| 3,846,751 | 11/1974 | Prieto | 340/146.1 AG |
| 4,167,727 | 9/1979 | Anderson et al. | 340/146.1 AG |

OTHER PUBLICATIONS

Mano, Computer Logic Design, Prentice-Hall, Inc., 1972, pp. 157-159.
Hill and Peterson, Introduction to Switching Theory and Logical Design, John Wiley & Sons, 1974, pp. 199-202.

Primary Examiner—Charles E. Atkinson
Attorney, Agent, or Firm—John K. Mullarney

[57] ABSTRACT

A parity circuit (FIG. 6) for n signals comprises n-1 parity building blocks (61-67) connected in a parity tree configuration. Each parity building block comprises three interconnected NAND gates (41-43). A first pair of signal inputs (A and B) are connected to the input of the first and second NAND gates (41 and 42), and a second pair of signal inputs (C and D) are connected to the input of the first and third NAND gates (41 and 43). The output of the first NAND gate (41) is coupled to the input of the second and third NAND gates (42 and 43). The pairs of inputs are controlled so that at least one signal in each pair is high ("1").

In an alternative embodiment of the parity building block, three NOR gates (91-93) are connected in the same manner as the aforementioned NAND gates and the pairs of inputs thereto are controlled so that at least one signal in each pair is low ("0").

Parity circuits in accordance with the disclosure can be used as parity generators or as parity checkers.

7 Claims, 11 Drawing Figures

LOGIC ONE FOR ODD NUMBER OF INPUTS AT LOGIC ZERO

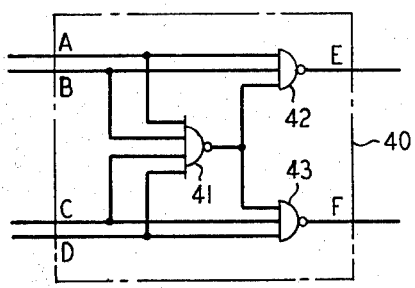
FIG. 4
FIG. 5
| EXAMPLE | INPUTS | | | | OUTPUTS | |
|---|---|---|---|---|---|---|
| | A | B | C | D | E | F |
| 1 | 0 | 1 | 0 | 1 | 1 | 1 |
| 2 | 0 | 1 | 1 | 0 | 1 | 1 |
| 3 | 0 | 1 | 1 | 1 | 1 | 0 |
| 4 | 1 | 0 | 0 | 1 | 1 | 1 |
| 5 | 1 | 0 | 1 | 0 | 1 | 1 |
| 6 | 1 | 0 | 1 | 1 | 1 | 0 |
| 7 | 1 | 1 | 0 | 1 | 0 | 1 |
| 8 | 1 | 1 | 1 | 0 | 0 | 1 |
| 9 | 1 | 1 | 1 | 1 | 1 | 1 |
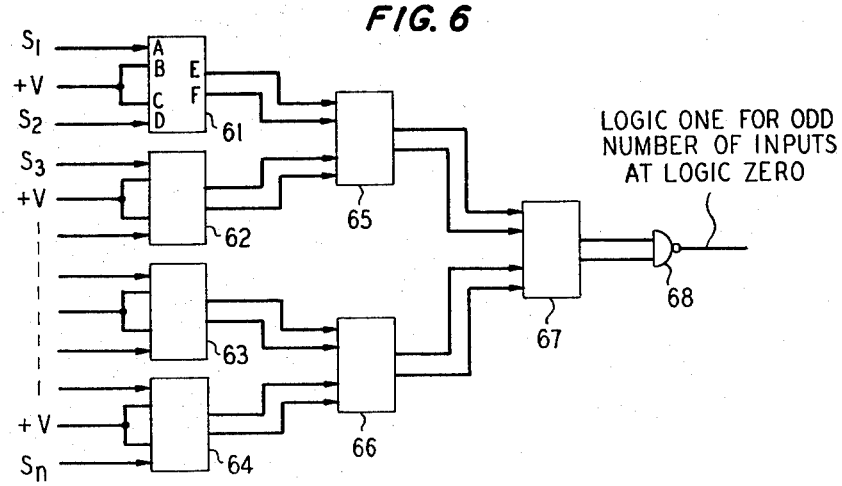
FIG. 6

FIG. 9
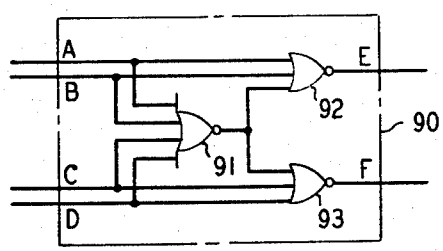
FIG. 10
| EXAMPLE | INPUTS | | | | OUTPUTS | |
|---|---|---|---|---|---|---|
| | A | B | C | D | E | F |
| 1 | 0 | 0 | 0 | 0 | 0 | 0 |
| 2 | 0 | 0 | 0 | 1 | 1 | 0 |
| 3 | 0 | 0 | 1 | 0 | 1 | 0 |
| 4 | 0 | 1 | 0 | 0 | 0 | 1 |
| 5 | 0 | 1 | 0 | 1 | 0 | 0 |
| 6 | 0 | 1 | 1 | 0 | 0 | 0 |
| 7 | 1 | 0 | 0 | 0 | 0 | 1 |
| 8 | 1 | 0 | 0 | 1 | 0 | 0 |
| 9 | 1 | 0 | 1 | 0 | 0 | 0 |
FIG. 11
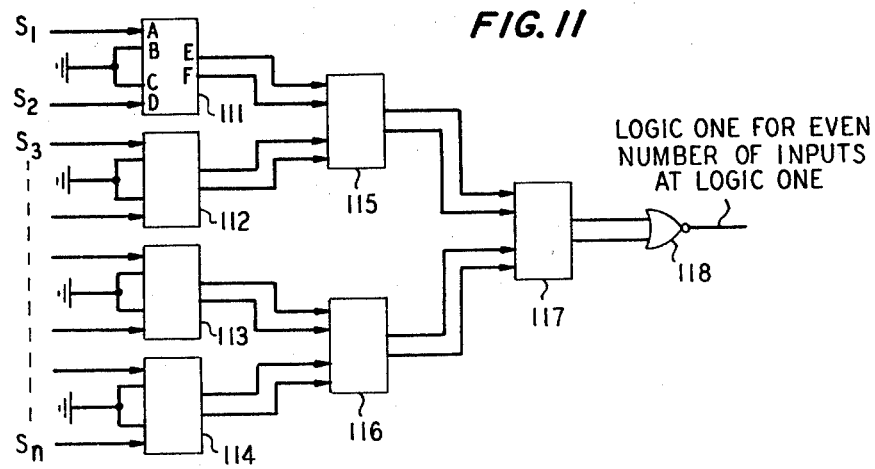

PARITY CIRCUITS

TECHNICAL FIELD

This invention relates to the field of digital error detecting systems, and more particularly, to the design of parity circuits (i.e., parity generators and parity checkers) for use therein.

BACKGROUND OF THE INVENTION

The avoidance of error is of major interest in any data-handling system. Among the major causes of error are component failure and intermittent data signal deviation resulting from noise. Errors of the first type may be reduced in frequency by improved circuit design, by using duplicate or redundant circuits, etc. Random errors due to noise usually occur with greater frequency, and they occur with greater frequency in some parts of a digital system than in others. Errors are particularly likely where transmission of data from one system or subsystem to another is involved. The longer and noisier the transmission path, the greater the likelihood of error. Errors may also occur in computer memories where information is generally read out in the form of low-level pulses.

If it can be determined that data received from a transmission line or sampled from a memory is erroneous, it is possible to take corrective action, such as a retransmission or a resampling of the data. To this end, numerous techniques have been devised to reduce the probability of an error going undetected. The simplest and most widely used approach is the parity check method. Briefly, the digital message, including a parity bit, is transmitted and then checked at the receiving end for error. An error is detected if the checked parity does not correspond to the one transmitted. The circuit that generates the parity bit at the transmitting end is called a parity generator; the circuit that checks the parity at the receiving end is called a parity checker.

The classical method of generating parity for an n-bit signal uses n−1 exclusive-OR circuits connected in a parity tree configuration; see "Introduction to SwitchingTheory and Logical Design" by F. J. Hill and G. R. Peterson, John Wiley & Sons (1974), FIG. 8.31. And the same circuit that is used for parity generation can also be used for parity checking purposes; see "Computer Logic Design" by M. M. Mano, Prentice-Hall, Inc. (1972), pages 157-159.

The prior art parity tree consisting of exclusive-OR modules is a widely used design because it is economical. Unfortunately, it operates too slowly to satisfy the ever increasing need for a faster parity circuit which is also economical. The patent to A. F. Bulfer et al, U.S. Pat. No. 3,718,904 issued Feb. 27, 1973, discloses parity circuits that achieve increased operating speed. However, the increased maximum operating speed is achieved at the expense of a higher gate count and more complicated interconnections between the gates.

SUMMARY OF THE INVENTION

It is a primary object of the present invention to provide a basic parity circuit design that is more economical and faster than the classical exclusive-OR parity circuit.

In accordance with the present invention, a parity circuit for n signals comprises n-1 parity building blocks connected in a parity tree configuration. Each parity building block has two pairs of inputs which are controlled so that at least one signal in each pair is high (or alternatively is low). The building block circuit has two outputs which are both set high (or alternatively low) when the parities of both pairs of inputs are even or both are odd. When the parities of the input pairs disagree, one of the outputs is high and the other is low. Thus, the parity of the two outputs leads is the same as that of the four input leads and the output leads can serve as an input pair for the next stage in the parity tree. The parity of all inputs is obtained by combining the two outputs of the final stage with a NAND (or alternatively a NOR) gate.

In a preferred embodiment of the invention each parity building block comprises three interconnected NAND gates. A first pair of signal inputs are connected to the input of the first and second NAND gates, and a second pair of signal inputs are connected to the input of the first and third NAND gates. The output of the first NAND gate is coupled to the input of the second and third NAND gates. The pairs of inputs are controlled so that at least one signal in each pair is high.

In another, alternative embodiment of the invention NOR gates are connected in the same manner as the aforementioned NAND gates and the pairs of inputs thereto are controlled so that at least one signal in each pair is low.

It is an important feature of the present invention that the above-described parity building blocks require one less gate and have one less gate delay than the classical exclusive-OR circuit.

Parity circuits designed in accordance with the present invention can be used as parity generators or as parity checkers.

BRIEF DESCRIPTION OF THE DRAWING

The invention will be more fully appreciated from the following detailed description when the same is considered in connection with the accompanying drawings, in which:

FIG. 4 is a schematic diagram of a parity building block made up of NAND gates in accordance with the present invention;

FIG. 5 is a truth table useful in the explanation of the operation of the building block circuit of FIG. 4;

FIG. 6 is a schematic diagram of a parity circuit for n signals comprising n−1 parity building blocks such as shown in FIG. 4;

FIG. 9 is a schematic diagram of a parity building block made up of NOR gates in accordance with the present invention;

FIG. 10 is a truth table useful in understanding the operation of the building block circuit of FIG. 9;

FIG. 11 is a schematic diagram of a parity circuit for n-signals comprising n−1 parity building blocks such as shown in FIG. 9.

DETAILED DESCRIPTION

Figure 1:
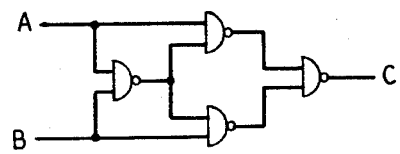
FIG. 1 is a schematic diagram of the prior art, exclusive-OR circuit.
Figure 2:
FIG. 2 is the symbolic representation of the exclusive-OR circuit of FIG. 1.
Figure 3:
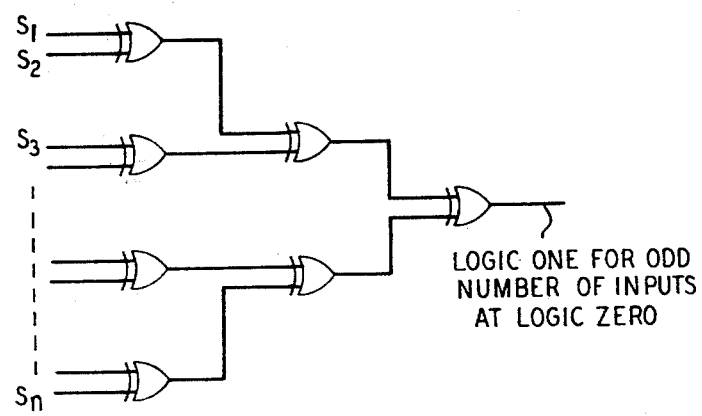
FIG. 3 is a schematic diagram of the classical parity generator consisting of n−1 exclusive-OR circuits connected in a parity tree configuration.

A classical, prior art, parity circuit building block is shown in FIG. 1 of the drawings. This circuit comprises four NAND gates connected in the illustrated and shown manner so as to provide an exclusive-OR mode of operation. The use of NAND gates to implement the exclusive-OR function has become quite prevalent in recent years for two reasons. One, an increase in reliability and economy normally results from the use of a single type of basic logic gate; and two, the use of semiconductor and integrated circuit logic enables the AND and NOT logic functions to be readily implemented in a single NAND gate logic package. This prior art NAND gate logic circuit is shown and described, for example, in the Bulfer et al patent, cited above. The symbolic representation of this exclusive-OR circuit is shown in FIG. 2, and FIG. 3 illustrates a parity generator for n signals consisting of n−1 exclusive-OR circuits connected in a conventional parity tree configuration. The cited FIG. 8.31 of the Hill-Peterson text shows a parity checker having the same circuit configuration as the parity circuit of FIG. 3. The prior art circuits shown in FIGS. 1-3 are so ubiquitous and well known that further discussion of the same seems unnecessary.

A new parity building block in accordance with the present invention is shown in FIG. 4 of the drawings. This circuit requires only three basic gates and has one less gate delay than the exclusive-OR circuit of FIG. 1. The parity building block circuit comprises the NAND gates 41–43. A first pair of inputs (A and B) are connected to the input of the NAND gates 41 and 42; a second pair of inputs (C and D) are connected to the input of the NAND gates 41 and 43; and, the output of NAND gates 41 is connected to the input of NAND gates 42 and 43. The pairs of inputs to the parity building block circuit 40 are controlled, in a manner to be described, so that at least one signal in each pair is high ("1").

The following simple rules summarize the operation of the parity building block circuit 40 of FIG. 4: (1) the circuit has two outputs (E and F) which are both set high ("1") when the parities of both pairs of inputs are even or both are odd; and (2) when the parities of the input pairs disagree, one of the outputs is high ("1") and the other is low ("0"). Therefore, the parity of the two outputs leads is the same as that of the four input leads and, as will be evident hereafter, the output leads can serve as an input pair for the next stage in a parity tree circuit.

The truth table of FIG. 5 is useful in understanding the operation of the parity building block circuit of FIG. 4. There are nine possible permutations of the four inputs (A,B,C,D), each input of course being either a binary one ("1") or a binary zero ("0"). These nine possible input combinations (called "examples") have been given decimal designations in the truth table of FIG. 5. For each input combination or permutation, the pair of outputs (E and F) assume a given state as indicated in FIG. 5. There are, of course, sixteen potential permutations of the four inputs, but since the pairs of inputs are controlled so that at least one signal in each pair is high, seven of the sixteen permutations are illegal. That is, they violate the restriction that at least one signal in each pair is high.

Now in accordance with the above-recited rules, when the parities of both pairs of inputs (A,B, C,D) are even (example 9 in the truth table of FIG. 5) or both are odd (examples 1, 2, 4 and 5), the outputs E and F are both set high. And, in accordance with rule number 2, when the parities of the input pairs disagree (examples 3, 6, 7 and 8), one of the outputs is high and the other is low. Accordingly, as will be evident from the truth table of FIG. 5, the parity of the two output leads (E and F) is the same as that of the four input leads. And, the output leads can serve as an input pair for the next stage in a parity tree circuit, such as shown in FIG. 6.

In FIG. 6, n−1 parity building block circuits 61–67 such as shown in FIG. 4 are connected in a parity tree configuration. The output leads of the building block circuits 61–64 of the input stage serve as the input pairs for the building blocks 65–66 of the next stage, and the output leads of the building blocks 65–66 serve as the input pairs for the parity building block 67 of the final stage. The parity of all inputs is obtained by combining the two outputs of the final stage with a NAND gate 68.

As previously stated, the pairs of inputs of each parity building block are controlled so that at least one signal in each pair is high. For the building block circuits 61–64 of the input stage, this control is obtained by connecting one input in each pair to a source (e.g., $+V = +5v$.). Furthermore, from the truth table of FIG. 5, it will be evident that each output pair of each parity building block 61–64 has at least one signal that is high ("1") and, therefore, the building blocks 65 and 66 (as well as 67) are also controlled so that at least one signal in each input pair is high.

For purposes of explanation, assume that the input digital word comprises eight digits ($S_1, S_2 \ldots S_n$, where n=8) having an arbitrary bit pattern of 01111000, i.e., $S_1=0, S_2=1, \ldots S_n=0$. From the truth table of FIG. 5, it will be seen that with the assumed input bit pattern the output of the parity building block circuit 61 will be odd (i.e., E=1, F=0); the output of the building block circuit 62 is even (E=1, F=1); the output of circuit 63 is odd (E=0, F=1); and the output of circuit 64 is even (1, 1). Further, since the parity of one pair of inputs to the parity building block circuit 65 is odd (1, 0) while the parity of the other pair of inputs is even (1, 1), the parity of the output pair of circuit 65 is odd. For the same reason, the parity of the output pair of the parity building block circuit 66 is also odd. And since the parities of both pairs of inputs to building block circuit 67 are odd, the parity of the output pair of circuit 67 is even (i.e., E=1, F=1). The parity output of the parity circuit of FIG. 6 is therefore zero ("0"), this being indicative of an even number of inputs at logic zero.

The foregoing example should suffice to provide an understanding of the operation of the parity circuit of FIG. 6. Other and different input bit patterns can, of course, be assumed and the logical sequence, set forth above, followed to determine the parity output for the assumed input bit pattern. The foregoing example should be sufficient, however, to prove to those skilled in the art the efficacy of the present invention as a parity generator or parity checker.

As previously indicated, the parity building block circuit of FIG. 4 requires one less gate than the prior art exclusive-OR circuit. The complete parity circuit of FIG. 6 requires one additional gate 68 to form the output function and, therefore, there is a total saving of n−2 basic gates in the overall parity circuit.

Figure 7:
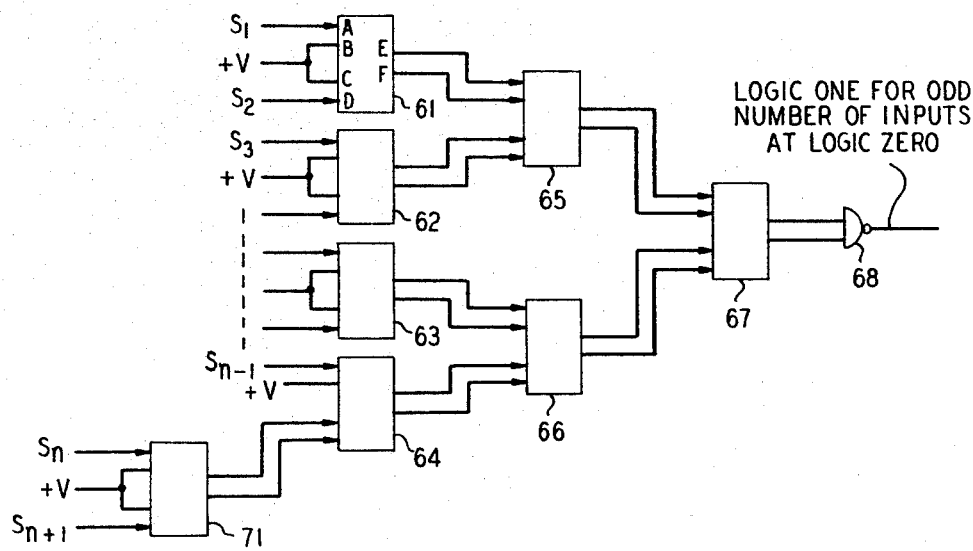
FIG. 7 shows a modification of the parity circuit of FIG. 6 for n+1 signals.

FIG. 6 is a schematic diagram of a parity circuit for n signals, where n=8. Minor modification of this circuit design is, of course, necessary for other and different values of n. FIG. 7, by way of example, shows a modification of the parity circuit design of FIG. 6 for n+1 input signals. The design of this circuit is essentially self-explanatory, particularly in view of the foregoing detailed description of the operation of FIG. 6. The same additional parity building block 71 functions in the same manner as the other building block circuits, and since it is in the input stage of the parity circuit, one signal in each input pair thereto is set high by connecting the same to the source +V.

Figure 8:
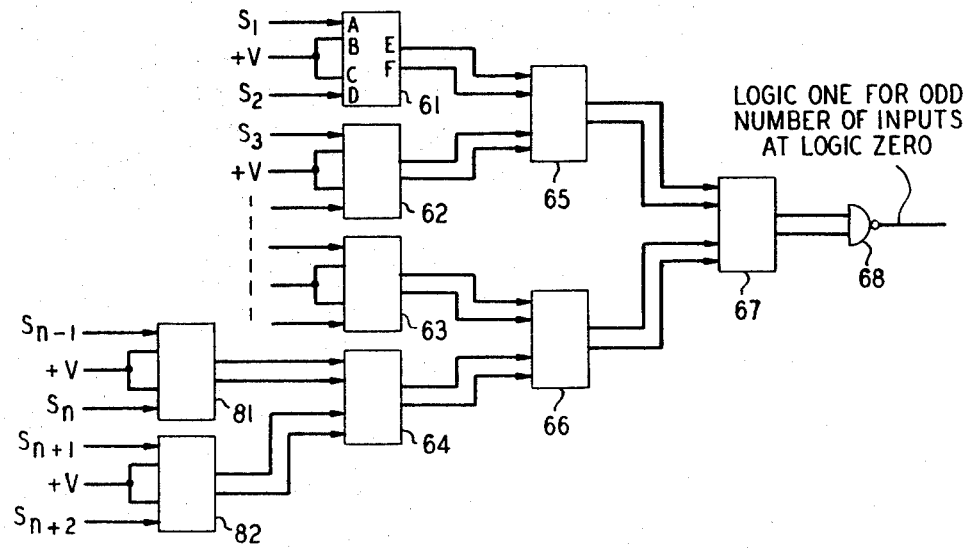
FIG. 8 shows a modification of the parity circuit of FIG. 6 for n+2 signals.

FIG. 8 shows a still further modification of the basic parity circuit design for n+2 input signals. Here again, the additional parity building block circuits 81 and 82 function in the same manner as heretofore described. The building block circuits 81 and 82 comprise part of the input stage of the parity circuit and therefore one of each pair of inputs thereto is connected to the source +V.

The foregoing examples should suffice to demonstrate to those in the art how readily the basic parity circuit design can be modified to accommodate any given number of input signals.

An alternative form of parity building block in accordance with the present invention is shown in FIG. 9 of the drawings. This circuit also requires only three basic gates and has one less gate delay than the exclusive-OR circuit of FIG. 1. The parity building block circuit of FIG. 9 comprises the NOR gates 91-93 connected in the same manner as the NAND gate of FIG. 4. More specifically, a first pair of inputs (A and B) are connected to the input of the NOR gates 91 and 92; a second pair of inputs (C and D) are connected to the input of the NOR gates 91 and 93; and, the output of NOR gate 91 is connected to the input of the NOR gates 92 and 93. The pairs of inputs to the parity building block circuit 90 are controlled, in a manner to be described, so that at least one signal in each pair is low ("0").

The following simple rules summarize the operation of the parity building block circuit 90 of FIG. 9: (1) the circuit has two outputs (E and F) which are both set low ("0") when the parities of both pairs of inputs are even or both are odd; and (2) when the parities of the input pairs disagree, one of the outputs is high ("1") and the other is low ("0"). Therefore, the parity of the two output leads is the same as that of the four input leads and the output leads can serve as an input pair for the next stage in a parity tree circuit.

The truth table of FIG. 10 is of use in understanding the operation of the parity building block circuit of FIG. 9. There are nine possible permutations of the four inputs (A,B,C,D) each input, of course, being either a binary one ("1") or a binary zero ("0"). These nine possible input combinations (or examples) have been given decimal designations in the truth table of FIG. 10. For each input combination or permutation, the pair of outputs (E and F) assume a given state as indicated in FIG. 10. There are, of course, sixteen potential permutations of the four inputs, but since the pairs of inputs are controlled so that at least one signal in each pair is low, seven of the sixteen permutations are illegal. That is, they violate the restriction that at least one signal in each pair is low.

Now in accordance with the above recited rules for the NOR gate embodiment, when the parities of both pairs of inputs (A.B, C.D) are even (example 1 in the truth table of FIG. 10) or both are odd (examples 5, 6, 8 and 9), the outputs E and F are both set low. And, in accordance with rule No. 2, when the parities of the input pairs disagree (examples 2, 3, 4 and 7) one, of the outputs is high and the other is low. Accordingly, as will be evident from the truth table of FIG. 10, the parity of the two output leads (E and F) is the same as that of the four input leads. And, the output leads can serve as an input pair for the next stage in a parity tree circuit, such as shown in FIG. 11.

In FIG. 11, $n-1$ parity building block circuits 111-117 such as shown in FIG. 9 are connected in a parity tree configuration. The output leads of the building block circuits 111-114 of the input stage serve as the input pairs for the building blocks 115-116 of the next stage, and the output leads of the building blocks 115-116 serve as the input pairs for the parity building block 117 of the final stage. The parity of all inputs is obtained by combining the two outputs of the final stage with a NOR gate 118.

As previously stated, the pairs of inputs of each (NOR gate) parity building block are controlled so that at least one signal in each pair is low. For the building block circuits 111-114 of the input stage, this control is obtained by connecting one input in each pair to ground potential. Furthermore, from the truth table of FIG. 10, it will be evident that each output pair of each parity building block 111-114 has at least one signal that is low ("0") and, therefore, the building blocks 115 and 116 (as well as 117) are also controlled so that at least one signal in each input pair is low.

For purposes of explanation, let us assume that the same 8-bit digital word is delivered to the input of the parity circuit of FIG. 11, i.e., the bit pattern of the input word is 01111000, where $S_1=0, S_2=1, S_3=1, \ldots S_n=0$. From the truth table of FIG. 10, it will be seen that with the assumed input bit pattern the output of the parity building block circuit 111 will be odd (i.e., $E=1, F=0$); the output of the building block circuit 112 is even ($E=0, F=0$); the output of circuit 113 is odd ($E=0, F=1$); and the output of circuit 114 is even (0, 0). Further, since the parity of one pair of inputs to the parity building block circuit 115 is odd (1, 0) while the parity of the other pair of inputs is even (0, 0), the parity of the output pair of circuit 115 is odd. For the same reason, the parity of the output pair of the parity building block circuit 116 is odd. And since the parities of both pairs of inputs to building block circuit 117 are odd, the parity of the output pair of circuit 117 is even (i.e., $E=0$, $F=0$). The parity output of the parity circuit of FIG. 11 is therefore one ("1"), this being indicative of an even number of inputs at logic one.

Other and different input bit patterns can be assumed and the logical sequence, set forth above, followed to determine the parity output for the assumed input bit pattern.

The complete parity circuit of FIG. 11 requires one additional gate 118 to form the output function and thus there is, here again, a total saving of $n-2$ basic gates in the overall parity circuit.

Minor modification of this basic parity circuit design is, of course, necessary for other and different values of n. For n+1 or n+2 input signals, for example, the (NOR gate) parity circuit design can be modified along the lines indicated in FIGS. 7 and 8, except that the additional input stage, building block(s) would, of course, be required to have one of each pair of inputs thereto connected to ground potential.

It is to be understood, therefore, that while the present invention has been described by reference to particular embodiments thereof, numerous modifications and alterations may be made by those skilled in the art without departing from the spirit and scope of the invention.

I claim:

1. A parity building block circuit having two pairs of inputs, said circuit comprising means for converting the parities of the two pairs of inputs into a single pair of output signals of corresponding parity, and means for controlling the pairs of inputs so that at least one signal in each pair is of the same predetermined potential.

2. In a parity circuit as defined in claim 1 wherein the converting means comprises three interconnected NAND gates, a first pair of inputs each being connected to the input of the first and second NAND gates, the second pair of inputs each being connected to the input of the first and third NAND gates, and the output of the first NAND gate being coupled to the input of the second and third NAND gates.

3. In a parity circuit as defined in claim 2 wherein at least one signal in each input pair is high.

4. In a parity circuit as defined in claim 1 wherein the converting means comprises three interconnected NOR gates, a first pair of inputs each being connected to the input of the first and second NOR gates, the second pair of inputs each being connected to the input of the first and third NOR gates, and the output of the first NOR gate being coupled to the input of the second and third NOR gates.

5. In a parity circuit as defined in claim 4 wherein at least one signal in each input pair is low.

6. A parity building block circuit having two pairs of inputs, said circuit comprising three connected NAND gates, a first pair of inputs each connected to the input of the first and second NAND gates, a second pair of inputs each connected to the input of the first and third NAND gates, the output of the first NAND gate being coupled to the input of the second and third NAND gates, and means for controlling the pairs of inputs so that at least one signal in each pair is high.

7. A parity building block circuit having two pairs of inputs, said circuit comprising three connected NOR gates, a first pair of inputs each connected to the input of the first and second NOR gates, a second pair of inputs each connected to the input of the first and third NOR gates, the output of the first NOR gate being coupled to the input of the second and third NOR gates, and means for controlling the pairs of inputs so that at least one signal in each pair is low.

* * * * *